United States Patent [19]
Crankshaw

[11] 3,802,465
[45] Apr. 9, 1974

[54] ACCUMULATOR
[75] Inventor: John H. Crankshaw, Erie, Pa.
[73] Assignee: Dynetics, Inc., Erie, Pa.
[22] Filed: Dec. 13, 1971
[21] Appl. No.: 207,370

[52] U.S. Cl. ................................................. 138/31
[51] Int. Cl. ............................................ F16l 55/04
[58] Field of Search .......................... 138/26, 30, 31

[56] References Cited
UNITED STATES PATENTS

| | | | |
|---|---|---|---|
| 2,828,770 | 4/1958 | Ellis | 138/30 |
| 1,885,457 | 11/1932 | Lard | 138/30 X |
| 2,383,180 | 8/1946 | Ellinewood | 138/30 X |
| 2,540,676 | 2/1951 | Johnson | 138/30 |
| 2,937,663 | 5/1960 | Ashton | 138/31 |
| 3,224,345 | 12/1965 | Doetsch | 138/30 X |
| 2,883,180 | 4/1959 | Moulton | 138/30 X |

FOREIGN PATENTS OR APPLICATIONS
1,096,319  12/1967  Great Britain ..................... 138/26

Primary Examiner—Herbert F. Ross

[57] ABSTRACT

The accumulator disclosed herein has a spring, which consists of two or more concentric steel cylinders with at least one cylinder sleeve of neoprene between them. The contact surfaces of the steel and the neoprene are bonded together and have a shear strength equal to the shear strength of the neoprene itself. The inner cylinder is connected to a piston rod and the outer cover encloses the assembly. The length of the space is such that sufficient preload is placed on the assembly to hold the parts together, even under shock conditions. A manifold connecting a relief valve and a check valve with the appropriate passages and porting is attached to the side of the cylinder, permitting the passage of oil into and out of both ends of the cylinder.

11 Claims, 7 Drawing Figures

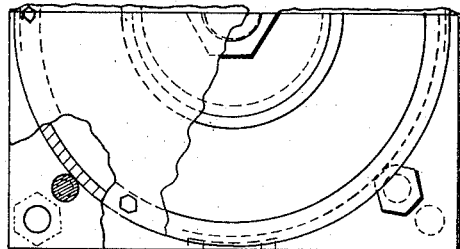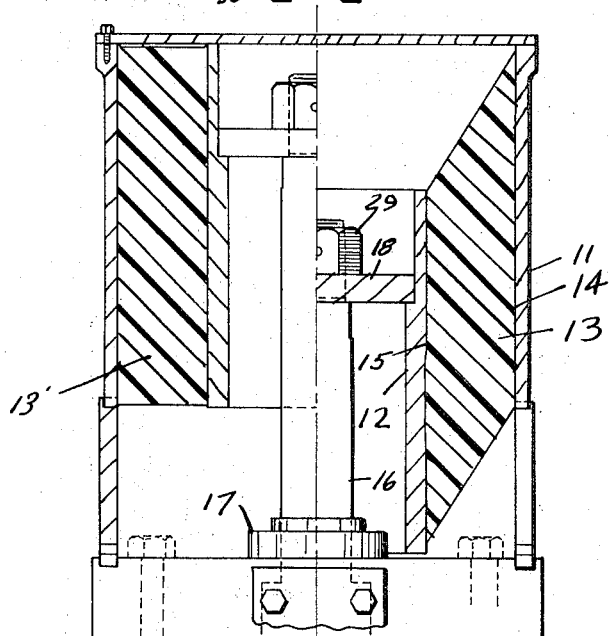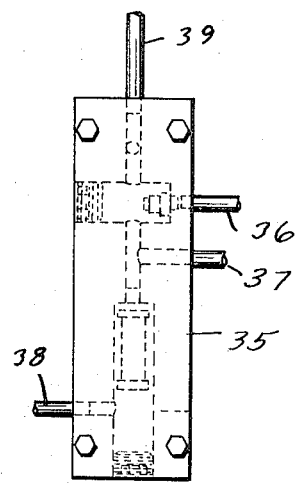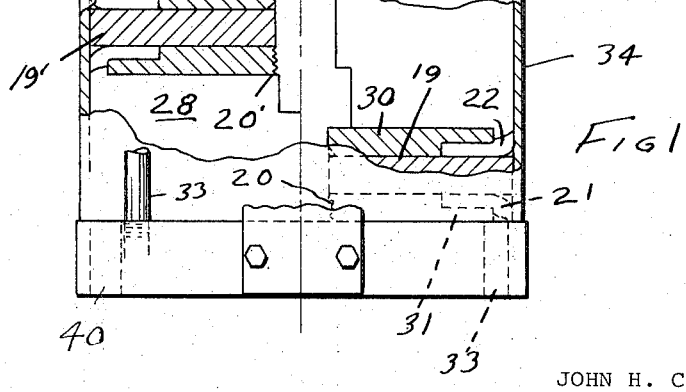

JOHN H. CRANKSHAW 3,802,465

ACCUMULATOR

GENERAL DESCRIPTION OF THE INVENTION

The accumulator is made up of two concentric cylindrical members having a sleeve of neoprene disposed between them and bonded to each. The inner cylindrical member is connected to a piston and the piston is slidable in a cylinder, fixed to the outer cylindrical member. A space is provided between the piston and the cylinder head for fluid which under pressure will distort the neoprene and thereby provide a resistance to movement of the piston. Another embodiment of the accumulator has a plurality of substantially concentric rigid members provided with neoprene between them to form a resilient member. The rigid member at the center is connected to the piston rod and the piston rod is connected to a piston which operates in a cylinder which may receive fluid under pressure to provide an accumulator. The concentric rigid members may be in the form of a single spiral. In a third embodiment, two spaced partition members made as that last described can be provided and they may receive the fluid under pressure therebetween thus providing an accumulator.

OBJECTS OF THE INVENTION

It is an object of the invention to provide an improved accumulator.

Another object of the invention is to provide an accumulator that is simple in construction, economical to manufacture, and simple and efficient to use.

Another object of the invention is to provide an accumulator made up of concentric rigid members having neoprene bonded to them thereby providing an accumulator spring.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a longitudinal cross sectional view, one half showing the piston in one position and the other half showing the piston in another position.

FIG. 2 is an end view of the accumulator shown in FIG. 1.

FIG. 3 is a side view of the valve used with the accumulator.

DETAILED DESCRIPTION OF THE DRAWINGS

Figure 4:
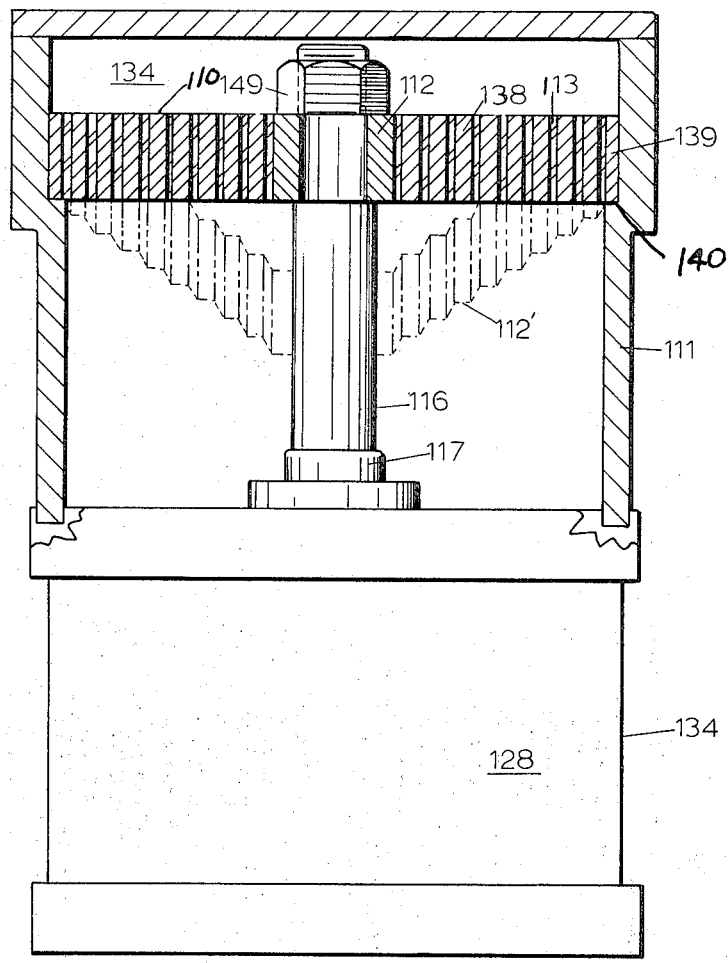
FIG. 4 is a longitudinal cross sectional view of the second embodiment of the accumulator.

Now with more particular reference to the drawings, the accumulator shown in FIGS. 1, 2 and 3 is made up of a first concentric cylinder 11 and a second concentric cylinder 12 disposed inside the first concentric cylinder. A sleeve of neoprene 13 is disposed between the cylinders 11 and 12 and bonded at 14 and 15 to the cylinders respectively and form a closure for the first cylindrical member. The inner rigid member 18 is fixed to the inner cylinder 12 and has the piston rod 16 fixed to it by the nut 29. The piston rod 16 extends through the bearing seal 17 and is attached to the piston 19 at 20. A sealing ring 21 is sandwiched between the plate 31 and the piston 19. A space 28 is provided below the piston so that when the piston is moved to the position 19', the neoprene sleeve 13' is distorted to the position shown. Thus, when gas is connected through the line 33 to the space 28 and the gas builds up pressure and forces piston 19 to the position 19' thereby distorting the neoprene 13. The piston 19 is slidably received in the third cylinder 34 which has cylinder head 40 closing its end. The valve 35 is provided to connect the lines 36, 37, 38 and 39 to a hand pump, a directional valve, an oil supply, and a pressure gauge, respectively.

In the embodiment of the invention shown in FIG. 4, a partition 110 is shown in outer cylinder 111. Inner cylinder 112 is disposed concentrically to outer cylinder 111. The rigid cylindrical members 138 are disposed concentrically to each other as shown. Neoprene material 113 is disposed in the annular spaces between members 138, the inner cylinder 112 and the outer cylinder 139. The outer cylindrical ring 139 rests on shoulder 140. The piston rod 116 is fixed to the inner cylindrical member 112 by means of a nut 149 which clamps piston rod 116 to inner cylinder 112. Thus pressure in the space 134 above spring partition 110 will distort the partition to position 112' and move the shaft to the new position.

The piston rod 116 is slidably received in the bearing 117 as shown and can have a load connected to its outer end. A piston can be attached to piston rod 116 as in FIG. 1.

Figure 5:
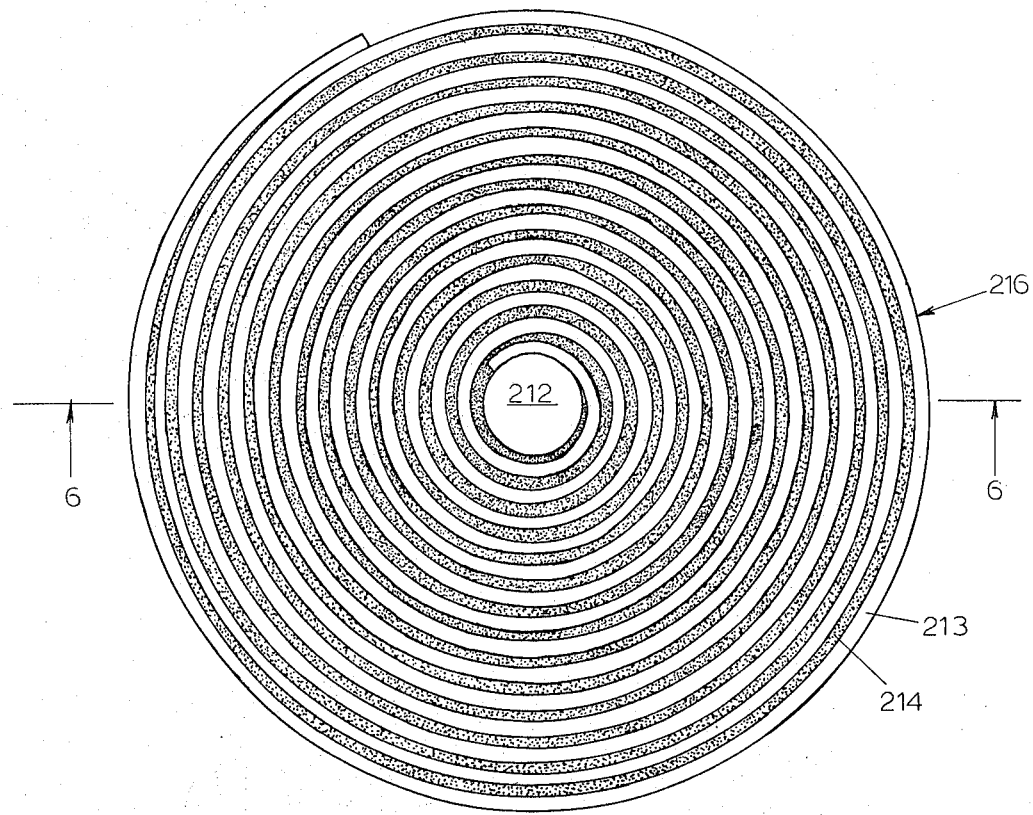
FIG. 5 is a top view of the resilient partition member and another embodiment of the invention.
Figure 6:
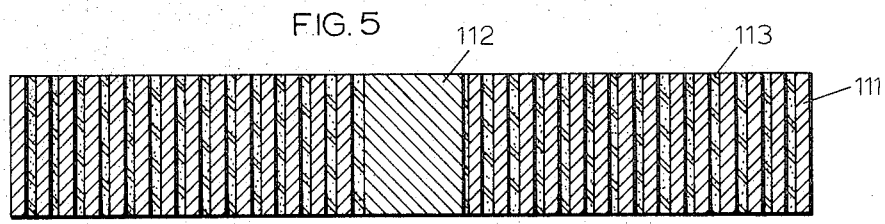
FIG. 6 is a longitudinal cross sectional view taken on line 6—6 of FIG. 5.

In FIGS. 5 and 6 a spring partition 216, similar to spring partition 110 in cylinder 111 of FIG. 4, is shown. In FIGS. 5 and 6, a spiral 213 made of hard steel is provided instead of the concentric rings of FIG. 4. Neoprene 214 is disposed between the convolutions of the spiral 213. The central rigid cylinder 212 may be attached to a piston rod. The spring partition in cylinder 216 can be used in an accumulator like that shown in FIGS. 1 and 2 or in an accumulator like that shown in FIG. 4.

Figure 7:
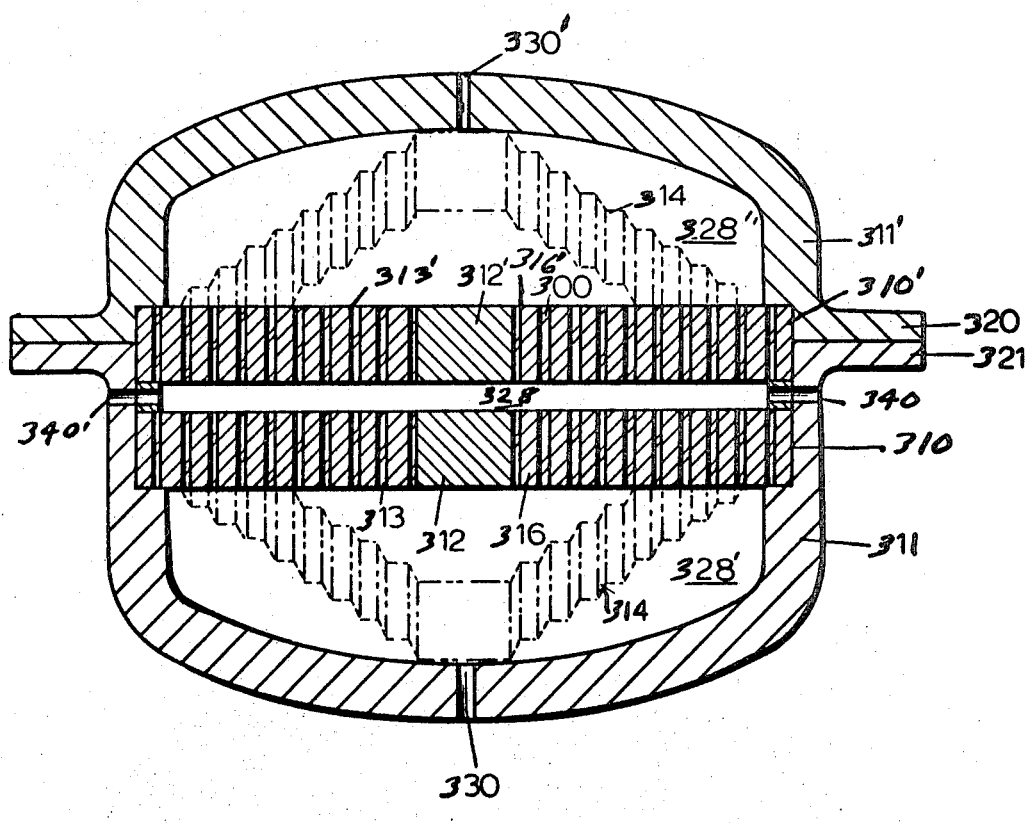
FIG. 7 is a longitudinal cross sectional view of yet another embodiment of the accumulator.

In the embodiment of the invention shown in FIG. 7, two spaced partitions 310 and 310' are shown disposed in the cuplike members 311 and 311'. The cuplike members 311 and 311' have flanges 320 and 321 for attaching them together by suitable spaced bolts or the like. The space 328 between partitions 310 and 310' may be connected through the openings 330 and 330' by a suitable line to a source of fluid. Another source of fluid under pressure may be connected to ports 340 and 340'. The rings 316 and 316' formed by the spiral are disposed substantially concentric to each other and bonded to the neoprene material 313 and 313'. Thus, when gas under pressure is injected into the space 328, the rings of neoprene will be distorted and the concentric rings will move axially relative to each other. Preload may be applied by gas under pressure in spaces 328' and 328''. The concentric rings 316 and 316' are bonded to the neoprene material 313 and 313', the partitions 310 and 310' will be distorted to the positions 314 and 314' when fluid under pressure is introduced into space 328.

In each embodiment there is provided an enclosure or cylinder and a partition or closure comprising neoprene bonded on its outer periphery and on its inner periphery over an area sufficient to provide a shear strength of the bonded joint equal to the shear strength of the material itself.

In each of the embodiments, the closure can be considered to be a spring with a rigid center and a resilient material between the outer periphery of the resilient material and the center. The contacting edges of the resilient material is put in shear by the force of fluid pressure against the spring. The bond strength of contact between the edges of the resilient material and the surface area of the rigid members engaged by the resilient material is approximately as great as the shear strength of the material itself.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An accumulator comprising a hollow cylindrical member having a closed end and an open end,
    a closure for said open end,
        said closure for said open end comprising a spring made up of a plurality of concentric generally cylindrical members made of relatively rigid material,
        a plurality of resilient sleeves disposed between said concentric cylindrical members and bonded thereto,
    means connecting said closure to said hollow member forming a closure therefor, and means connecting the hollow of said hollow cylindrical member to a source of fluid under pressure whereby a fluid pressure in said hollow distorts said resilient sleeves and acts as an accumulator.

2. The accumulator recited in claim 1 wherein two said closure members are provided in spaced relation to each other,
    said closure members are substantially cylindrical and said resilient material is substantially cylindrical.

3. The accumulator recited in claim 1 wherein said resilient material has the properties of neoprene.

4. An accumulator comprising, a first cylindrical and a second cylindrical member disposed concentric to each other,
    a plurality of resilient cylindrical members and a plurality of rigid cylindrical members disposed between said resilient cylindrical members and bonded thereto,
    the outer of said resilient members being bonded to said first cylindrical member,
    the inner of said resilient members being bonded to said second cylindrical member,
    a piston attached to said second cylindrical member,
    a third cylinder fixed to said first cylindrical member,
    and a piston slidably received in said third cylinder,
    and a space to receive fluid under pressure in said cylinder in engagement with said piston whereby said piston moves the piston rod and deforms or distorts said resilient material.

5. The accumulator recited in claim 4 wherein a piston rod guide member is disposed between said piston and said first cylinder and said piston slidably receives said guide member.

6. An accumulator comprising,
    a plurality of first cylindrical members and a plurality of second cylindrical members disposed concentric to each other,
    one of said second cylindrical members having a closed end,
    a plurality of neoprene sleeves,
    said neoprene sleeves being disposed between said first cylindrical members and said second cylindrical members and bonded to said first cylindrical members and to said second cylindrical members,
    a third cylindrical member disposed in alignment with said second cylindrical member,
    a rod guide closing one end of said third cylindrical member,
    a piston slidably received in said third cylindrical member,
    a piston rod attached to said piston and to said first cylindrical member,
    a cylinder head on said third cylindrical member,
    said piston and said cylinder head defining a closed space for fluid whereby said fluid forces said first cylindrical member into engagement with said closed space on said second cylindrical member thereby deforming said neoprene sleeve.

7. The accumulator recited in claim 6 wherein said rod support provides a chamber for a fluid whereby said piston rod is moved and said neoprene sleeve is distorted.

8. An accumulator comprising,
    a chamber,
    a partition in said chamber,
    a disk comprising generally concentric substantially circular members made of relatively rigid material,
    and a plurality of generally cylindrical neoprene sleeves disposed between said generally circular members,
    means bonding the side edges of said concentric member to said neoprene sleeves,
    and means to receive fluid under pressure in engagement with said partition whereby said neoprene sleeves are distorted and gas is compressed.

9. The accumulator recited in claim 8 wherein said circular members are made of a continuous helical member.

10. The accumulator recited in claim 9 wherein two said partitions are disposed in spaced relation to each other and said space defines a space for fluid under pressure whereby said partitions are distorted.

11. The accumulator recited in claim 9 wherein a piston rod is attached to said partition and a piston is slidably received in a cylinder member,
    said piston being connected to said partition.

* * * * *